United States Patent

[11] 3,632,320

| [72] | Inventors | Yoshinori Henmi<br>Komaki-shi;<br>Hideaki Suzuki, Ohbu-shi; Tadao Kamiya,<br>Nagoya-shi, all of Japan |
|---|---|---|
| [21] | Appl. No. | 868,928 |
| [22] | Filed | Oct. 23, 1969 |
| [45] | Patented | Jan. 4, 1972 |
| [73] | Assignee | Nippon Toki Kabushiki Kaisha<br>Nagoya-shi, Japan |
| [32] | Priority | Feb. 13, 1968 |
| [33] | | Japan |
| [31] | | 43/8682 |
| | | Continuation-in-part of application Ser. No. 795,700, Jan. 31, 1969, now abandoned. This application Oct. 23, 1969, Ser. No. 868,928 |

[54] PROCESS FOR THE MANUFACTURE OF RESIN-BOUND ABRASIVE GRINDER
7 Claims, No Drawings

[52] U.S. Cl. ........................................... 51/298, 51/293

[51] Int. Cl. ........................................ C08g 51/12
[50] Field of Search .............................. 51/293, 298

[56] References Cited
UNITED STATES PATENTS

| 2,008,723 | 7/1935 | Mills............................ | 51/298 |
| 2,072,507 | 3/1937 | Mahlman et al............... | 51/298 |
| 2,577,060 | 12/1951 | Wooddell et al.............. | 51/298 |
| 2,599,506 | 6/1952 | Wooddell et al.............. | 51/298 |

*Primary Examiner*—Donald J. Arnold
*Attorney*—Stevens, Davis, Miller & Mosher

ABSTRACT: A process for the manufacture of a resin-bound abrasive grinder having superior strength, grinding performance and wear resistance, which comprises heating a synthetic resin or dissolving it in a suitable solvent to liquidize it, adding at least one inorganic filler to the liquidized resin to thoroughly wet the filler therewith and bind same together thereby forming a binding composition, incorporating the binding composition with an abrasive material and then pressure forming the resultant mixture to manufacture the resin-bound abrasive grinder.

PROCESS FOR THE MANUFACTURE OF RESIN-BOUND ABRASIVE GRINDER

This application is a continuation-in-part of copending application Ser. No. 795,700 filed Jan. 31, 1969 now abandoned. This invention relates to an excellent abrasive grinder in which a mixture of a synthetic resin and fillers is used as a binder (the grinder being hereinafter referred to as "new resin-bound grinder"), and to the manufacture thereof.

A grinder is generally manufactured by binding together particles of fused alumina, sintered alumina, silicon carbide, boron carbide, diamond or the like with use of a ceramic binder, natural or synthetic rubber, synthetic resin, silicate or the like as a binder. The use of a so-called, conventional resin-bound grinder wherein a synthetic resin is used as a binder has recently been increased. Such a conventional grinder has relatively high strength and may be used in grinding operations performed under heavy load at high-speed revolution, thereby rendering the operations efficient. A relatively low aging temperature can be used in the preparation of the conventional grinder containing as a binder a synthetic resin which is an organic compound and this permits various fillers to be introduced into the binder. The introduction of the fillers has made it possible to greatly improve the conventional resin-bound grinder in grinding performance.

A conventional resin-bound grinder containing, as a binder, a phenol-form aldehyde resin which is the most frequently used as such, is usually prepared by adding a liquid resin called a wetting agent to an abrasive material and agitating the resultant mixture to wet the abrasive material, further adding to the thus-obtained mixture a powdered resin alone or a mixture of the powdered resin with the aforesaid fillers to produce green body, pressure forming the green body in conventional dies and then aging the formed body to obtain the conventional resin-bound grinder. The green body may be pressure formed in the dies while heating it, if desired.

In such a resin-bound grinder consisting of an abrasive material and a filler or fillers which are bonded with use of a synthetic resin as a binder, this bond is believed to be effected mechanically or by van der Waals' bond in view of the fact that the abrasive material and filler are each an inorganic substance while the synthetic resin for bonding the two substances is an organic substance.

The strength of the mechanical bond depends upon the degree of wetting the inorganic substances with the synthetic resin. In view of this, many improvements have hitherto been made in the bond; for example, the use of a surface treating agent such as a silicone resin has been proposed.

The primary object of this invention is to provide a new resin-bound grinder having an increased strength and improved wear resistance for use in abrading operations.

In the practice of this invention, in order to obtain a satisfactory wetting of an inorganic filler in a finely particulate form with a synthetic resin, the filler is added to and then mixed with the liquid synthetic resin which has been dissolved in a specific solvent such as methanol, ethanol, furfural, or the like. Alternately, the resin may first be liquefied by heating. The synthetic resin is preferably a polymerizable or condensable, initial condensation resin. If a catalyst for polymerization or condensation is used, it should be added to the synthetic resin and filler after these two have been mixed. The resultant mixture of the three or the binding composition is then incorporated with the abrasive material.

The new resin-bound grinders which are manufactured by using as a binding composition a mixture prepared by mixing a filler with an initial condensation resin dissolved in a specific solvent or liquefied by heating, have remarkably increased strength, superior wear resistance in abrading operations and longer lifetime as such.

The synthetic resins which can be used in the process of this invention are phenol-formaldehyde resins and the aniline-modified and vinyl-modified forms thereof, preferably novolak-type phenol-formaldehyde resins, aniline-modified and vinyl-modified novolak-type phenol-formaldehyde resins, and epoxy and polyvinyl alcohol resins. Among these resins are particularly preferable the initial condensation products or precondensates of novolak-type phenol-formaldehyde and the aniline-modified and vinyl-modified forms thereof, the precondensates having a melting point of 60°–110° C., preferably 80°–100° C. A resin sold under the trademark of "Powdered Phenol-Formaldehyde Resin BRP-5222" by Union Carbide Corporation, U.S.A., can also be used if the hexamethylenetetramine (curing agent) contained therein is removed therefrom before it is used. The removal of the curing agent is achieved by washing the powdered resin with a diluted hydrochloric acid solution and then thoroughly washing the resin with water.

According to this invention, curing agents such as hexamethylenetetramine should not be added to the starting resin such as novolak before melt mixing the resin with an inorganic filler and cooling the resulting mixture, to avoid the premature curing of the resin. Premature curing makes difficult or impossible not only the melt mixing of the resin and filler but the performance of other subsequent operations. More particularly, phenol-form aldehyde resin is a two-stage resin, and the initial condensation products or precondensates thereof behave similarly to thermoplastic resins and may thus be melted without causing further polymerization or curing at a suitable temperature below their decomposing temperature.

On the other hand, curing agents such as hexamethylenetetramine can be advantageously added during the pulverization of the mixture prepared by melt mixing the precondensate with the filler and cooling the resulting mixture to room temperature to produce a binding composition which can easily be cured with aid of the curing agents when heated.

The initial condensates or precondensates of the novolak-type phenol-formaldehyde resin can be produced, for example, by introducing 100 parts by weight of commercial phenol and 85 parts by weight of formalin, an approximately 30 percent aqueous solution of formaldehyde, into a stainless steel reactor, adding one part by weight of 12N—HCl thereinto, allowing the mixture to boil and react for a period of 3 hours, distilling the thus-obtained mixture to remove therefrom the water produced therein by the reaction and then recovering the residual reaction products from the reactor. These products are the initial condensates which have a melting point of 85°–90° C. The other modified phenol-formaldehyde resins can also be produced by following the same procedure as the above using the corresponding starting materials.

Examples of abrasives which may be used in the process of this invention are fused alumina, sintered alumina or silicon carbide, suitable examples of which are as follows:
1. Fused alumina:
   1. fused alumina grains, sold under the trademarks "C–32, R–46, and C–34" by Carborundum Co., U.S.A. or under the trademarks "Regular A, 44A, and 38A" by Norton Co., U.S.A.
   2. fused alumina containing about 10 percent of zirconia (trademark, R–71), sold by the Carborundum Co., and fused alumina containing approximately 40 percent of ZrO (trademark AZ–40), sold by Exolon Co., U.S.A.
2. Sintered alumina:
   1. sintered alumina grains, sold under the trademark "R–62 (Carborod)" by Carborundum Co., U.S.A.
   2. sintered alumina grains, sold under the trademark "75A" by Norton Co., U.S.A.
3. Silicon carbide:
   silicon carbide grains, sold under the trademarks "C–1 C–5, C–6, etc." by Carborundum Co., U.S.A.

The grains of these abrasives have a mesh size of 8–220.

Examples of fillers, which may be used in the production of the grinders of this invention, are shown below:
1. Cryolite:
   1. cryolite such as "Greenland Spar" produced in Greenland, the Spar containing at least 98 percent by weight of $3NaF \cdot AF_3$
2. Iron sulfide:

1. iron sulfide such as pyrite containing at least 95 percent by weight of $FeS_2$
3. Other fillers:
   1. potassium fluoborate (chemical reagent)
   2. fluospar ($CaF_2$)
   3. zincblende (ZnS)
   4. lead chloride (chemical reagent)
   5. lead sulfide (chemical reagent)
   6. lime (CaO content: 95 percent by weight or higher)

These fillers should have a mesh size of 120 or finer, preferably mesh 240 or finer.

The starting materials and amounts thereof which may be used in the manufacture of a resin-bound grinder according to this invention, are as follows:

| | |
|---|---|
| Abrasive grain | 50–90% by weight |
| Resin | 5–40% by weight |
| Filler(s) | 1–40% by weight |

The product grinder will decrease in grinding ability if the starting abrasive is used in an amount of less than 50 percent and it will lower in strength if more than 90 percent of the abrasive is used. It will also decrease in grinding ability if more than 40 percent of the resin is used in strength if less than 5 percent thereof is used. Furthermore, the use of less than 1 percent of the filler or fillers will decrease the grinding ability of the product grinder to be obtained and the use of more than 40 percent thereof will lessen the strength of the grinder.

Together with these starting materials, a wetting agent for the abrasive can be used in an amount of 10 percent by weight or less. The wetting agents which can be employed are furfural and resol-type liquid phenol-formaldehyde resins. An example of the use of the wetting agents is as follows:

A novolak-type resin is melted and mixed with an inorganic filler, and the resulting mixture is cooled to room temperature and then pulverized while adding hexamethylenetetramine thereto in order to produce a binding composition (or binder). A Muller mixer, for example, "Lancaster" is charged with an abrasive and then with a wetting agent such as furfural or a resol-type liquid phenol-formaldehyde resin. These materials so charged are mixed under agitation and then kneaded with the binding composition to obtain a green body which will subsequently be pressure formed in the predetermined dies.

A solvent for liquidizing the resin can also be used in an amount of not higher than 100 percent, preferably 50 percent, by weight of the resin. However, the solvent is volatilized off, for instance, during curing, before producing a final product.

This invention will be better understood by the following example.

EXAMPLE 1

The materials and amounts thereof used in the manufacture of a resin-bound grinder of this example are as follows:

| | |
|---|---|
| Fused alumina abrasive No. 12 | 70 parts by weight |
| Phenol-form aldehyde (novolak) resin | 12 parts by weight |
| Iron sulfide powder | 10 parts by weight |
| Cryolite powder | 6 parts by weight |
| Furfural | 2 parts by weight |

The novolak was introduced into an airtight stainless steel vessel purged with an inert gas, melted at a temperature of approximately 200° C. and then incorporated with the iron sulfide powder and the cryolite powder. The resulting mixture was thoroughly mixed, allowed to cool, discharged from the vessel and then pulverized together with hexamethylenetetramine added during this pulverization to obtain a binding composition which can be used in the manufacture of grinders according to this invention. Using the known technique, the binder so obtained was mixed with the fused alumina abrasive, molded at a pressure of 300 kg./cm.² and at ambient temperature and then aged at an elevated temperature not higher than 180° C. for about 24 hours to produce the new resin-bound grinders.

The furfural mentioned above was used as a wetting agent for use in the preparation of the green body which was subsequently pressure formed.

A conventional grinder was prepared from starting materials of the same composition as set forth above. The abrasive was charged into a Muller mixer, for example, "Lancaster." Thereafter, the wetting agent was added under agitation followed by the resin and fillers. The materials thus charged were thoroughly mixed to produce a green body which was subsequently pressure formed at 300 kg./cm.² and at ambient temperature in dies and then aged at an elevated temperature not higher than 180° C. for about 24 hours to produce conventional resin-bound grinders.

The following table 1 shows the comparison in strength and grinding performance between the new grinder prepared according to this invention and the ordinary one prepared by the conventional process. These grinders were tested for their strength, grinding performance and wear resistance by using them in grinding the test pieces of spring steel under the load of 400 kg.

TABLE 1

| | Grinder manufactured according to this invention | Grinder manufactured by the conventional process |
|---|---|---|
| Flexural strength (kg./cm.²) | 650 | 520 |
| Amount removed from test piece by grinding (kg./hr.) | 105 | 109 |
| Amount removed from grinder by wear (kg./hr.) | 8.4 | 12.8 |

EXAMPLE 2

Another resin-bound grinder according to this invention was manufactured by using the following starting materials:

| Ingredients | Parts by weight |
|---|---|
| Sintered alumina abrasive No. 10 | 65 |
| Phenol-form aldehyde (novolak) resin | 12 |
| Iron sulfide powder | 10 |
| Cryolite powder | 8 |
| Lime powder | 3 |
| Furfural | 2 |

The novolak resin was introduced into a stainless steel vessel, 20 parts of methanol per 100 parts of the novolak resin introduced were added to the resin, and the resulting mixture heated to 40° C., incorporated with the iron sulfide powder and cryolite powder and then thoroughly mixed with agitation. The thus-obtained mixture was withdrawn into a shallow vessel to evaporate the methanol therefrom and then pulverized, While adding thereto the limestone powder and hexamethylenetetramine to prepare a binder according to this invention.

Then the sintered alumina abrasive was mixed with the furfural and then mixed with agitation to form an intimate mixture of them which was subsequently incorporated with the aforesaid binder. The mixture so obtained was charged into suitable dies, thereafter molded at a pressure of 280 kg./cm.² and a temperature of 180° C. and then aged at a temperature of 180° C. for about 24 hours to obtain a grinder of high density.

The following table 2 shows the comparison in strength and grinding performance between the novel grinder manufactured according to this invention and the one manufactured by the conventional process described in example 1 except that the molding was at 280 kg./cm.² and a temperature of 180° C. from the starting materials having the same composition as those for the aforesaid novel grinder of this example.

These grinders were tested for their strength, grinding performance and wear resistance by using them in grinding the test pieces of stainless steel (SUS–27, JIS, which is just comparable to AISI 302) under the load of 400 kg.

TABLE 2

|  | Grinder manufactured according to this invention | Grinder manufactured by the conventional process |
| --- | --- | --- |
| Flexural strength (kg./cm.²) | 750 | 600 |
| Amount removed from test piece by grinding (kg./hr.) | 120 | 125 |
| Amount removed from grinder by wear (kg./hr.) | 4.1 | 6.3 |

It is of course desired that grinders should have as high strengths as possible especially from the viewpoint of safety because they are usually used while revolving at a high speed, and it is very economically advantageous if they have high wear resistance, these properties are met by the grinder manufactured according to this invention.

What is claimed is:

1. A process for the manufacture of a resin-bound abrasive grinder comprising:

a. heating a novolak phenol-formaldehyde resin to liquidize same without causing the curing thereof,
   b. adding at least one inorganic filler to the liquidized resin to form a binding composition comprising said filler wetted with said resin,
   c. pulverizing said binding composition,
   d. adding abrasive material to said binding composition to form a resin-bound grinder,
   e. pressure molding, and
   f. aging and curing the thus-obtained molding at an elevated temperature.

2. A process according to claim 1 wherein said binder composition is cooled to avoid premature curing prior to step (c) and is then pulverized together with a curing agent in step (c).

3. A process according to claim 2 wherein said curing agent is hexamethylenetetramine.

4. The process according to claim 2 wherein said abrasive material is wetted with a wetting agent before mixing with the binding composition and curing agent.

5. The process according to claim 4 wherein said wetting agent is furfural.

6. A process according to claim 1 wherein said filler is selected from cryolite, iron sulfide, potassium fluoborate, fluospar, zincblende, lead chloride, lead sulfide, and lime.

7. A process according to claim 1 wherein said abrasive is selected from sintered alumina, fused alumina and silicon carbide.

* * * * *